F. H. KOHLER.
PARALLELOGRAM FOR DRAFTING.
APPLICATION FILED SEPT. 20, 1912.
1,057,852.
Patented Apr. 1, 1913.
3 SHEETS—SHEET 1.
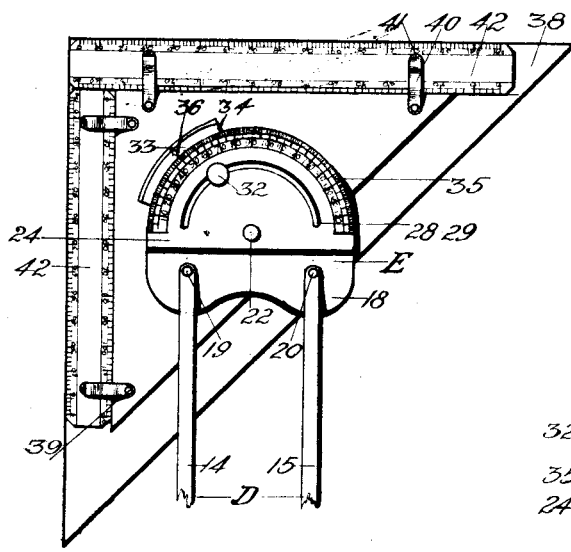
Fig. 4.
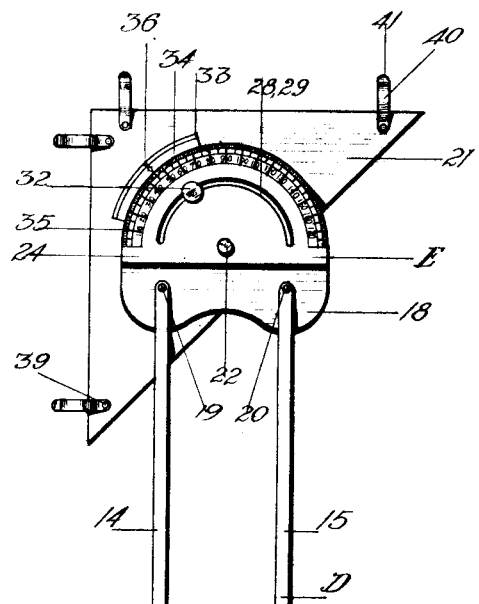
Fig. 1.
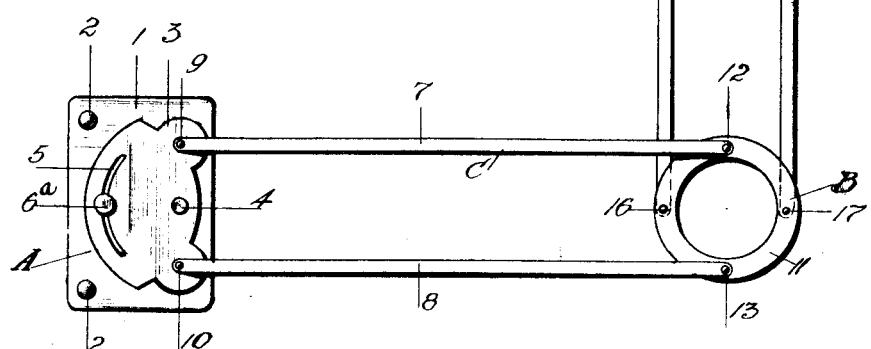
Witnesses
H. P. Bertholy
F. W. Ackman Jr.
Inventor
Frank H. Kohler.
By Victor J. Evans
Attorney F. H. KOHLER.
PARALLELOGRAM FOR DRAFTING.
APPLICATION FILED SEPT. 20, 1912.
1,057,852.
Patented Apr. 1, 1913.
3 SHEETS—SHEET 2.
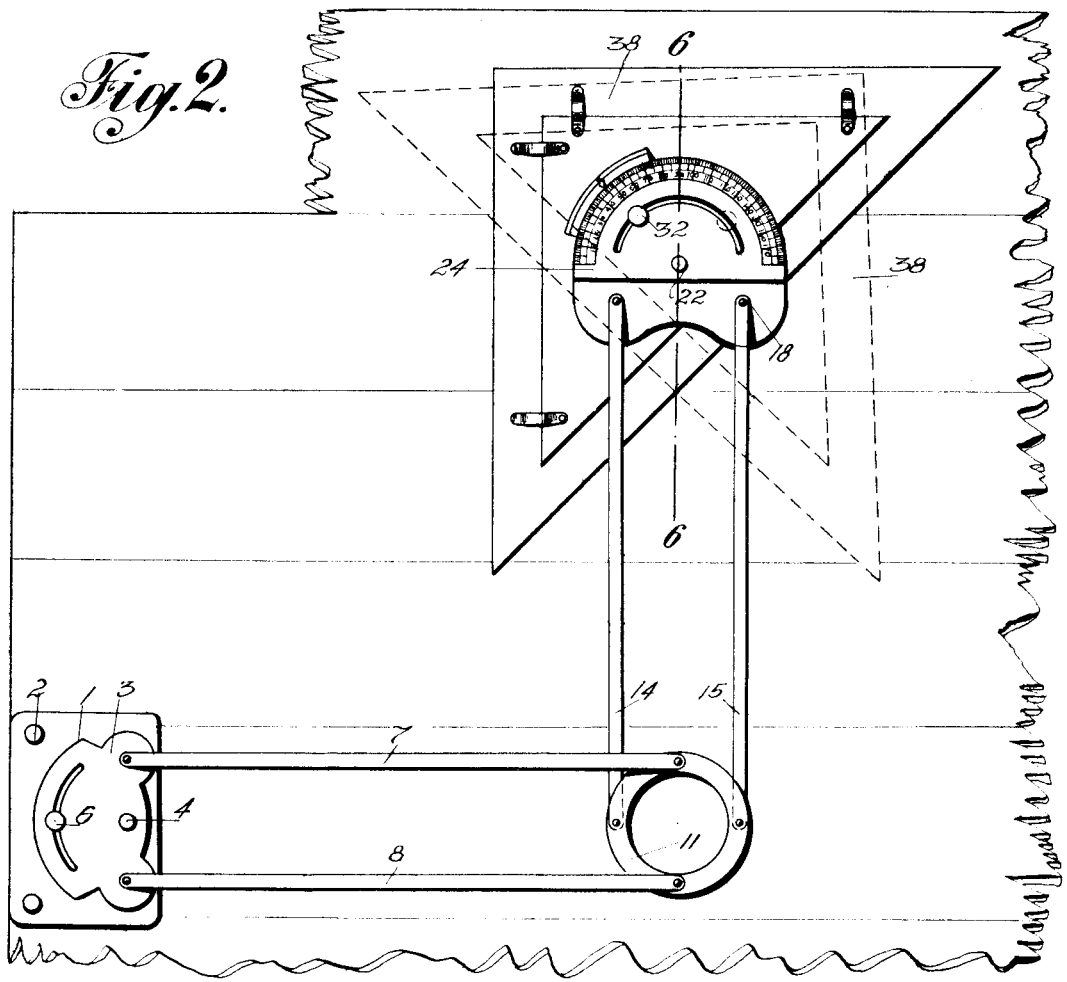
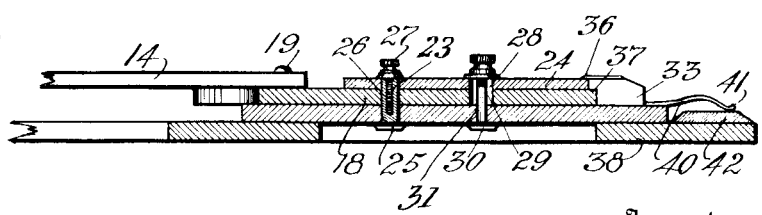
Witnesses
H. P. Bertholy
Fw. Ackman Jr.
Inventor
Frank H. Kohler.
By Victor J. Evans
Attorney F. H. KOHLER.
PARALLELOGRAM FOR DRAFTING.
APPLICATION FILED SEPT. 20, 1912.
1,057,852.
Patented Apr. 1, 1913.
3 SHEETS—SHEET 3.
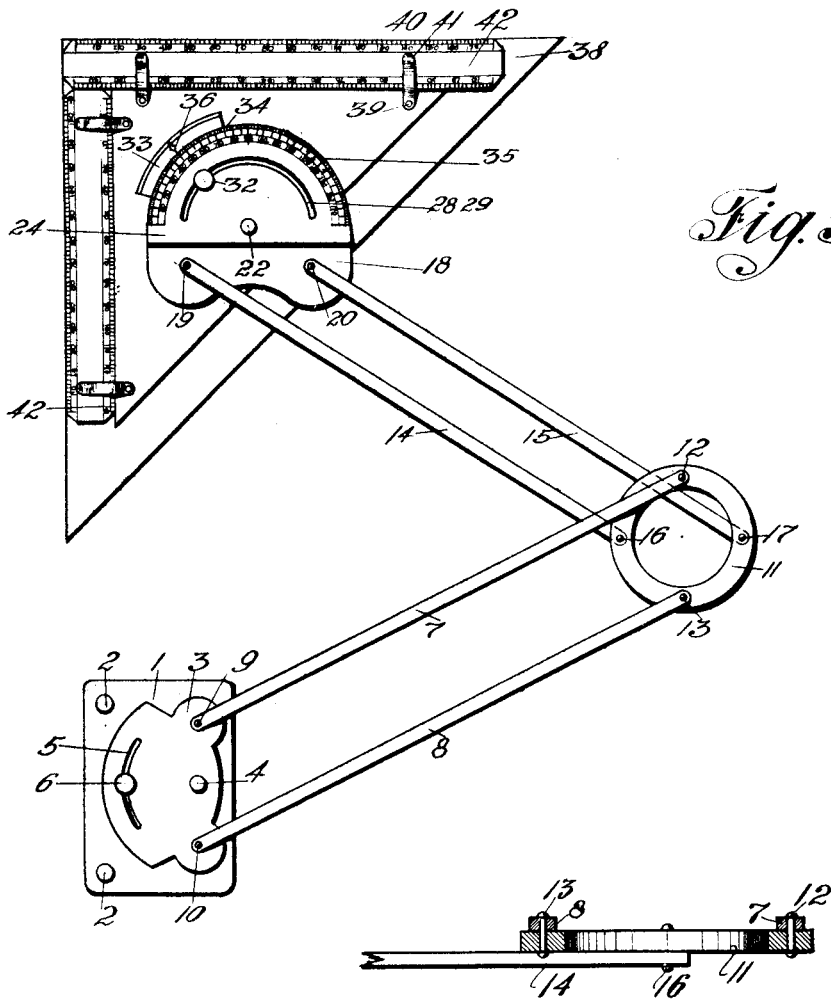
Fig. 3.
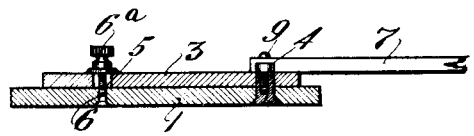
Fig. 7.
Fig. 8.
Inventor
Frank H. Kohler.
Witnesses
H. S. Bertholy
Geo. Ackman Jr.
By Victor J. Evans
Attorney

UNITED STATES PATENT OFFICE.

FRANK H. KOHLER, OF TACOMA, WASHINGTON.

PARALLELOGRAM FOR DRAFTING.

1,057,852.   Specification of Letters Patent.   Patented Apr. 1, 1913.

Application filed September 20, 1912. Serial No. 721,439.

*To all whom it may concern:*

Be it known that I, FRANK H. KOHLER, a citizen of the United States, residing at Tacoma, in the county of Pierce and State of Washington, have invented new and useful Improvements in Parallelograms for Drafting, of which the following is a specification.

My invention relates to drafting instruments and in particular to a device adapted to be attached to a drawing board and to a triangle for use in connection therewith so as to connect the same together and to maintain the triangle in the same angular relation to the said drawing board throughout movement of the former upon the board.

The primary object of the invention is to provide an attachment of the class described which is adapted to be secured to the drawing board at some initial, angular relation thereto, and to have an ordinary triangle secured to its movable head at the desired angle to the drawing board and so that it may be readily attached thereto, the triangle after being angularly adjusted and fixed in this position being adapted to maintain the same angular relation to the drawing board during movement of the said head over the board.

The invention consists of the features of construction, combination and arrangement of parts, hereinafter fully described and claimed, reference being had to the accompanying drawings, in which:—

Figure 1 is a plan view of the attachment alone. Fig. 2 is a plan view of the attachment secured to a drawing board, and having a triangle secured in position upon the movable head, the dotted lines showing the triangle adjusted angularly. Fig. 3 is a similar view showing the movable head in a different adjusted position. Fig. 4 is a plan view of the movable head and triangle attached thereto showing measuring scales attached to the triangle. Fig. 5 is a front elevation of the movable head as shown in Fig. 4. Fig. 6 is a sectional view taken on the line 6—6 of Fig. 2. Fig. 7 is a transverse sectional view taken through the elbow annulus. Fig. 8 is a transverse sectional view taken through the base.

Referring to the drawings, the component parts of the device may be generally designated as the base A, the elbow B, the swinging arms C and D, and the movable head E.

The base A comprises a flat attaching plate 1 which is adapted to be secured to the drawing board by means of suitable screws or thumb tacks 2, and the adjustable plate 3. The plate 3 is pivotally secured to the upper surface of the attaching plate 1 by means of the pintle 4, and is provided with an arcuate slot 5 concentric with the pintle 4 adapted to receive a clamping bolt 6 provided with a knurled nut 6ª carried by the plate 1 so that the adjustable plate 3 may be locked in different angular relations to the attaching plate. The arm C comprises a pair of parallel link members 7 and 8, the outer ends of which are pivotally secured to the adjustable plate 3 by means of the pivot pins 9 and 10, respectively. The elbow B is in the form of an annulus 11 which has pivotally secured thereto on its upper surface at diametrically opposite points, the opposite extremities of the link members 7 and 8 of the arm C by means of the pivot pins 12 and 13, respectively. The arm D consists of a pair of parallel link members 14 and 15 whose inner ends are pivotally secured to the under surface of the annulus 11 at points diametrically opposite each other and separated by an angle of 90° from the pivot points of the link members 7 and 8, by means of the pivot pins 16 and 17, respectively.

In the construction of the movable head, a semi-circular plate 18 is attached to the end of arm D, the extremities of the link members 14 and 15 being pivotally connected thereto by means of the pivot pins 19 and 20, respectively. An attaching member 21 constructed preferably of wood or some such material is secured pivotally to the plate 18 by means of a bolt 22 provided with a longitudinally extending threaded recess 23 communicating with its upper end, the upper end of said bolts extending past the upper face of the plate 18, this projecting portion being received within an opening in a protractor 24. A screw member 25 provided with a threaded reduced portion 26 and a head 27 is adapted to have the threaded portion 26 screwed into the recess within the member 22 so that the head 27 thereof engages the upper face of the protractor 24 so as to clamp the said protractor and plate 18 together and to pivotally connect both members with the attaching member 21.

The plate 18 and the protractor 24 when in the position just described have their rounded edges slightly spaced from each other, the edge of the plate 18 projecting slightly past the edge of the protractor so as to provide a horizontal ledge or face 37, and are provided with registering, arcuate slots 28 and 29, respectively, for the reception of a clamping bolt 30 extending upwardly through an opening 31 in the attaching member 21, so that the said attaching triangle may be adjusted in different angular positions with respect to the said protractor and the plate 18 may be secured in any one of these positions by means of the knurled clamping bolt 32 which is threaded onto the protruding upper end of the bolt 30. An arcuate bar 33 is attached to the upper surface of the attaching triangle adjacent the right angular corner thereof and is adapted to have its inner concave face 34 in frictional engagement with the outer convex face 35 of the protractor. This bar 33 is centrally provided with an indicator point 36 adapted to overlie the ledge 37 provided by the outer edge of the plate 18, the upper face of the said pointer lying in the plane of the upper face of the protractor. The attaching triangle member is adapted to be secured to an ordinary drawing triangle 38 composed of celluloid or some such transparent material, by means of a plurality of attaching bolts 39 arranged along the right-angular base arms of the said triangle and preferably adjacent the ends thereof so as not to form an obstruction to the link members of the arm D upon angular adjustment of the triangle with respect to the movable head E. A spring clip 40 has its inner end secured to one of the attaching bolts 30 and has its outer portion curved downwardly and then upwardly to its end, as shown at 41. The spring clips arranged along either side of the triangle are adapted to engage the upper face of a scale 42 of suitable length to hold the same in position against the upper face of the said triangle so that its outer edge lies in the plane of the outer edge of the triangle, the said scale adapted to be used in measuring while the triangle is being used for the usual purpose.

It will be seen that I have provided a device of the class described which is adapted to be readily attached to any drawing board so that the movable head is adapted to be changed in position on the face of the said board, the triangle itself adapted to be angularly adjusted with respect to the movable head, and the attachment as a whole adapted to be angularly adjusted with respect to the attaching base. This construction renders the device capable of the most minute adjustments and adapted to serve its purpose efficiently and accurately when in use.

What is claimed is:

1. A device of the class described comprising a base, an annulus, an arm including parallel link members operatively connecting said annulus with the base, a movable head comprising a semi-circular plate, a second arm including parallel link members operatively connecting said plate with the annulus, an attaching member pivotally connected to said plate and being angularly adjustable with respect thereto, and means for locking said member in different adjusted positions, said attaching member adapted to have a drawing triangle secured thereto.

2. A device of the class described comprising a base, an elbow annulus, an arm including link members operatively connecting said annulus with the base, a second arm including parallel link members connected to said annulus, a movable head consisting of a semi-circular plate operatively connected to said second arm, an attaching member adjustably secured to said plate, means for securing a drawing triangle to said attaching member, and means carried by said securing means adapted to hold a measuring scale against the upper face of said drawing triangle in suitable proximity to either free edge thereof.

3. A device of the class described comprising a base, an elbow annulus, an arm including link members operatively connecting said annulus with the base, a second arm including parallel link members connected to said annulus, a movable head including a semi-circular plate operatively connected to said second arm, an attaching member pivoted to said plate, means for securing said member in different adjusted positions with relation to the said plate, a drawing triangle attached to the under face of said attaching member, and a plurality of spring clips secured to the upper face of the attaching member adjacent the side edges thereof and adapted to overlie the projecting free portions of the triangle for securing measuring scales in position against the triangle at the free edges thereof.

4. A device of the class described comprising a base, an elbow annulus, an arm including link members operatively connecting said annulus with the base, a second arm including parallel link members connected to said annulus, a movable head including a semi-circular plate operatively connected to said second arm, an attaching member pivoted to said plate, means for securing said member in different adjusted positions with relation to the said plate, a drawing triangle attached to the under face of said attaching member, and a plurality of spring clips pivotally connected to said attaching member adjacent the free edges thereof and adapted to be swung into outwardly projecting position so as to overlie the free edges of the said triangle for attaching measuring scales thereto.

5. A device of the class described comprising a base, an elbow annulus, an arm including link members operatively connecting said annulus with the base, a second arm including parallel link members connected to said annulus, a movable head including a semi-circular plate operatively connected to said second arm, an attaching member pivotally connected to said plate against the under face thereof and adapted to have a drawing triangle secured thereto, a protractor secured to the upper face of said plate concentric with respect to the attaching member pivot, an indicator bar carried by the attaching member and having an indicator point oppositely associated with the said protractor, and means for adjusting said attaching member angularly with respect to the said plate.

6. A device of the class described comprising a base, an elbow annulus, an arm including parallel link members connecting said annulus with the base, a second arm including parallel link members connected to said annulus, a movable head including a plate operatively connected to said second arm, an attaching member adjustably secured to said plate, said member being triangular in shape, a drawing triangle secured to the under face of said attaching member with its edges parallel to the edges of the said member, and means for securing a measuring scale upon the upper face of said drawing triangle against each free edge of the attaching member.

In testimony whereof I affix my signature in presence of two witnesses.

FRANK H. KOHLER.

Witnesses:
WALTER A. KOHLER,
GEORGE C. FLEEMAN.